(12) United States Patent
Banik et al.

(10) Patent No.: US 9,765,416 B2
(45) Date of Patent: Sep. 19, 2017

(54) ALLOY MELTING AND REFINING METHOD

(71) Applicant: ATI Properties LLC, Albany, OR (US)

(72) Inventors: Anthony V. Banik, Monroe, NC (US);
Henry E. Lippard, Monroe, NC (US);
Brandon C. Wilson, Monroe, NC (US)

(73) Assignee: ATI Properties LLC, Albany, OR (US)

( * ) Notice: Subject to any disclaimer, the term of this patent is extended or adjusted under 35 U.S.C. 154(b) by 171 days.

(21) Appl. No.: 14/748,788

(22) Filed: Jun. 24, 2015

(65) Prior Publication Data
US 2016/0376685 A1 Dec. 29, 2016

(51) Int. Cl.
*C22B 9/04* (2006.01)
*C22B 9/18* (2006.01)
(Continued)

(52) U.S. Cl.
CPC ............. *C22C 19/07* (2013.01); *C22B 9/003* (2013.01); *C22B 9/006* (2013.01); *C22B 9/04* (2013.01); *C22B 9/18* (2013.01); *C22B 9/20* (2013.01); *C22C 19/03* (2013.01); *C22C 19/055* (2013.01); *C22C 19/056* (2013.01); *C22F 1/10* (2013.01)

(58) Field of Classification Search
CPC .. C22B 9/04; C22B 9/003; C22B 9/18; C22B 9/20; C22C 19/03; C22C 19/07
See application file for complete search history.

(56) References Cited

U.S. PATENT DOCUMENTS 4,726,508 A * 2/1988 Carpenter ................ B23K 1/18
228/262.31
5,103,458 A * 4/1992 Soykan .................... H05B 7/07
164/497
(Continued)

FOREIGN PATENT DOCUMENTS

EP 2423340 A1 2/2012

OTHER PUBLICATIONS

Kutz, Myer, ed. Mechanical Engineers' Handbook: Materials and Mechanical Design. 3rd ed. Hoboken, NJ: John Wiley & Sons, 2006. 287-334. Accessed from the Web Feb. 28, 2017.*
(Continued)

*Primary Examiner* — George Wyszomierski
*Assistant Examiner* — Tima M McGuthry Banks
(74) *Attorney, Agent, or Firm* — K&L Gates LLP

(57) ABSTRACT

A method of melting and refining an alloy comprises vacuum induction melting starting materials to provide a vacuum induction melted alloy. At least a portion of the vacuum induction melted alloy is electroslag remelted to provide an electroslag remelted alloy. At least a portion of the vacuum arc remelted alloy is vacuum arc remelted to provide a singly vacuum arc remelted alloy. At least a portion of the singly vacuum arc remelted alloy is vacuum arc remelted to provide a doubly vacuum arc remelted alloy. In various embodiments, a composition of the vacuum induction melted alloy comprises primarily one of vanadium, chromium, manganese, iron, cobalt, nickel, copper, niobium, molybdenum, technetium, ruthenium, rhodium, palladium, silver, tantalum, tungsten, rhenium, osmium, iridium, platinum, and gold.

8 Claims, 2 Drawing Sheets

(51) Int. Cl.
| | |
|---|---|
| C22B 9/20 | (2006.01) |
| C22C 19/03 | (2006.01) |
| C22C 19/07 | (2006.01) |
| C22F 1/10 | (2006.01) |
| C22B 9/00 | (2006.01) |
| C22C 19/05 | (2006.01) |

(56) References Cited

U.S. PATENT DOCUMENTS

| | | | | |
|---|---|---|---|---|
| 2002/0170386 | A1* | 11/2002 | Bond | C22B 9/20 |
| | | | | 75/10.25 |
| 2005/0051243 | A1* | 3/2005 | Forbes Jones | A61L 31/022 |
| | | | | 148/442 |
| 2006/0075624 | A1 | 4/2006 | Seth | |
| 2011/0195269 | A1* | 8/2011 | Minisandram | B22D 7/02 |
| | | | | 428/615 |
| 2012/0039740 | A1* | 2/2012 | Wojcik | B22F 1/0014 |
| | | | | 420/441 |
| 2012/0042749 | A1* | 2/2012 | Popper | C22B 9/18 |
| | | | | 75/10.25 |
| 2014/0271337 | A1* | 9/2014 | Banik | B21J 1/06 |
| | | | | 420/448 |

OTHER PUBLICATIONS

ATI Annual Report. Rep. N.p.: ATI, 2012. Relentless Innovation. ATI, 2012. Web. Feb. 28, 2017.*
"UDIMET alloy 720." Special Metals. Published 2004. Accessed from the Web Feb. 28, 2017.*
"INCONEL alloy 718." Special Metals. Published 2007. Accessed from the Web Feb. 28, 2017.*
"CAS Registry No. 1627728-03-3." SciFinder. American Chemical Society, 2017. Web. Feb. 28, 2017.*
Heaney, Joseph A. et al. "Development of a new cast and wrought alloy (Rene 65) for high temperature disk applications." International Symposium on Superalloy 718 and Derivatives. Sep. 28-Oct. 1, 2014. Abstract. Accession No. 2015:1127870 from SciFinder.*
Moyer et al., "Advances in Triple Melting Superalloys 718, 706 and 720," Superalloys 718, 625, 706 and Various Derivatives, The Minerals, Metals & Materials Society, 1994, pp. 39-48.
Rohrbach, K., "Carpenter Technical Articles—Trends in High Temperature Alloys", Carpenter Technology Corporation, Jan. 1998, printed from http://www.cartech.com/techarticles.aspx?id=1648, 6 pages.
Malara et al., "Alloy 718 Large Ingots Studies", Superalloys 718, 625, 706 and Derivatives 2005, The Minerals, Metals & Materials Society, 2005, pp. 25-33.

* cited by examiner

ALLOY MELTING AND REFINING METHOD

BACKGROUND OF THE TECHNOLOGY

Field of Technology

The present disclosure relates to multi-step methods for melting and refining superalloys and other alloys. The present disclosure also is directed to alloys prepared and refined using the multi-step melting and refining methods described herein, as well as to mill products and manufactured products including the alloys.

Description of the Background of the Technology

Various techniques are known for melting and refining superalloys so that the alloys are suitably free from problematic inclusions, segregation, and other defects. Various emerging technologies will require larger and more massive alloy forms, placing greater demands on existing melting and refining techniques. For example, current melting and refining techniques used to produce superalloys for turbine disk components allow ultrasonic indications to be addressed at intermediate stages during processing of the alloys without significantly impacting final part costs. With the advent of significantly larger turbo machinery such as, for example, the GE90 and GEnx turbine engines, substantially larger superalloy billets with sizes sufficient for very large disk components are required. These superalloy billets may have weights greater than 1000 lbs., and turbine engines in development may require superalloy billets up to 3000 lbs. Existing melting and refining techniques may be incapable of producing superalloy billets of this size on a cost-effective basis due to, for example, substantial yield loss as material that fails ultrasonic inspection and other non-destructive testing is scrapped.

Accordingly, there is a need to develop an improved melting and refining process for producing superalloys and other alloys.

SUMMARY

According to one non-limiting aspect of the present disclosure, a method of melting and refining an alloy comprises a vacuum induction melting (VIM) step, an electroslag remelting (ESR) step, and first and second vacuum arc remelting (VAR) steps. Starting materials are vacuum induction melted to provide a vacuum induction melted alloy comprising a primary constituent (based on weight percentages) that is any of vanadium, chromium, manganese, iron, cobalt, nickel, copper, niobium, molybdenum, technetium, ruthenium, rhodium, palladium, silver, tantalum, tungsten, rhenium, osmium, iridium, platinum, and gold. In other words, more of the "primary" constituent is present in the vacuum induction melted alloy on a weight percentage basis than any other constituent of the vacuum induction melted alloy. At least a portion of the vacuum induction melted alloy is electroslag remelted to provide an electroslag remelted ingot. At least a portion of the electroslag remelted ingot is vacuum arc remelted in a first vacuum arc remelted operation to provide a vacuum arc remelted ingot. At least a portion of the vacuum arc remelted ingot is vacuum arc remelted in a second vacuum arc remelting operation to provide an ingot of double vacuum arc remelted alloy.

According to another non-limiting aspect of the present disclosure, a method of melting and refining an alloy comprises: vacuum induction melting starting materials to provide a vacuum induction melted alloy; electroslag remelting at least a portion of the vacuum induction melted alloy to provide an electroslag remelted alloy; vacuum arc remelting at least a portion of the electroslag remelted alloy to provide a singly vacuum arc remelted alloy; and vacuum arc remelting at least a portion of the singly vacuum arc remelted alloy to provide a doubly vacuum arc remelted alloy. In various embodiments of the method, the vacuum induction melted alloy comprises primarily one of vanadium, chromium, manganese, iron, cobalt, nickel, copper, niobium, molybdenum, technetium, ruthenium, rhodium, palladium, silver, tantalum, tungsten, rhenium, osmium, iridium, platinum, and gold.

According to yet another non-limiting aspect of the present disclosure, a method of melting and refining an alloy comprises: vacuum induction melting starting materials to provide an alloy; electroslag remelting at least a portion of the alloy to provide a first ingot; vacuum arc remelting at least a portion of the first ingot to provide a second ingot; and vacuum arc remelting at least a portion of the second ingot. In various embodiments of the method, the alloy comprises primarily one of vanadium, chromium, manganese, iron, cobalt, nickel, copper, niobium, molybdenum, technetium, ruthenium, rhodium, palladium, silver, tantalum, tungsten, rhenium, osmium, iridium, platinum, and gold.

BRIEF DESCRIPTION OF THE DRAWINGS

Features and advantages of the methods, systems, and alloy articles described herein may be better understood by reference to the accompanying drawings in which.

The reader will appreciate the foregoing details, as well as others, upon considering the following detailed description of certain non-limiting embodiments of methods and systems according to the present disclosure. The reader also may comprehend certain of such additional details upon using the methods and systems described herein.

DETAILED DESCRIPTION OF CERTAIN NON-LIMITING EMBODIMENTS

In the present description of non-limiting embodiments and in the claims, other than in the operating examples or where otherwise indicated, all numbers expressing quantities or characteristics of ingredients and products, processing conditions, and the like are to be understood as being modified in all instances by the term "about." Accordingly, unless indicated to the contrary, any numerical parameters set forth in the following description and the attached claims are approximations that may vary depending upon the desired properties one seeks to obtain in the methods, systems, and articles according to the present disclosure. At the very least, and not as an attempt to limit the application of the doctrine of equivalents to the scope of the claims, each numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

Figure 1:
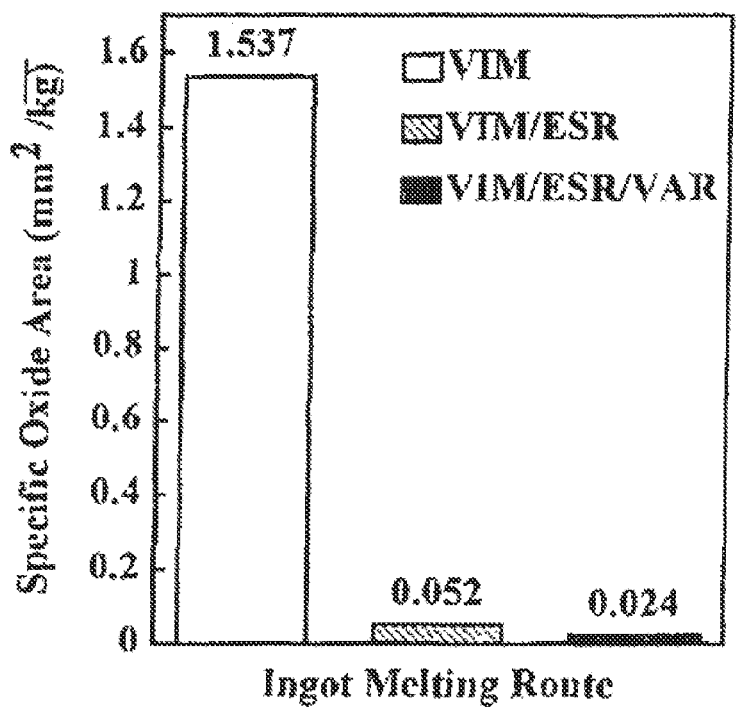
FIG. 1 is a graph illustrating oxide area per unit mass for electron beam button melt testing on Alloy 718 using VIM only and sequences of VIM-ESR and VIM-ESR-VAR (triple melt)
Figure 2:
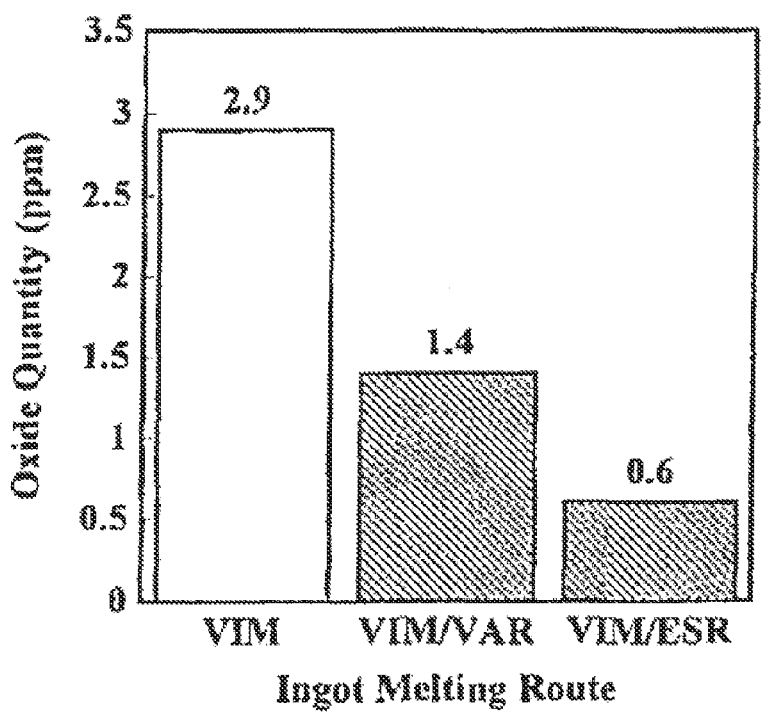
FIG. 2 is a graph illustrating oxide quantity (ppm) for button melt testing on Alloy 718 for VIM only, VIM-ESR, and VIM-VAR routes.

Current conventional processes for melting and refining nickel base superalloys used in turbine components and other high performance parts incorporate a vacuum induction melting (VIM) operation followed by either a vacuum arc remelting (VAR) operation or an electroslag remelting (ESR) operation. An alternate melting and refining method used to produce nickel base superalloy for turbine components consists of steps of vacuum induction melting (VIM), followed by electroslag remelting (ESR), and then followed by vacuum arc remelting (VAR). This VIM+ESR+VAR processing route, is commonly referred in the industry as the triple-melt process. The triple melt process combines a VIM operation for basic melting and refining of the charge materials, an ESR operation that reduces oxide inclusions, and a final VAR operation to minimize segregation of alloying elements. The relative effectiveness VIM-ESR, VIM-VAR, and VIM-ESR-VAR (triple melt) sequences in refining the nickel base superalloy Alloy 718 (UNS N07718) can be seen in the FIGS. 1 and 2, which appear in Moyer et al., "Advances in Triple Melting Superalloys" (1994). FIG. 1 plots the oxide area per unit mass for electron beam button melt testing on Alloy 718 using VIM only and sequences of VIM-ESR and VIM-ESR-VAR (triple melt). FIG. 1 shows a reduction in oxide content of over 50% for a triple melt sequence relative to a VIM-ESR sequence. FIG. 2 plots oxide quantity (ppm) for button melt testing on Alloy 718 for VIM only, VIM-ESR, and VIM-VAR routes, and shows that an ESR operation is significantly more effective than VAR at reducing oxide inclusion incidence in Alloy 718.

During a final VAR operation, isolated oxides that became entrapped in alloy drops during ESR melting, or that collect on interior crucible surfaces during VAR melting and drop into the alloy, may become entrapped during solidification. These oxide segregates can render the alloy unsuitable for fabrication into turbine disk components and other high performance parts. In some cases, the segregates form an interface in the alloy that can be detected during ultrasonic inspection after billet conversion. In other cases, the segregates may carry into the final part and be a cause for rejection of a component during final part inspection. The deficient billet or finished part is then scrapped, reducing yield and increasing production costs.

In the production of certain steel alloys requiring extremely high cleanliness, a melting and refining process with the sequence VIM+VAR+VAR has been used. When remelting steel alloys, the alloys' high melting point results in a relatively deep melt pool on the top of the forming VAR ingot. This allows the molten material additional residence time, permitting oxide inclusions to float to the surface as a result of the density difference with the base alloy. A VIM+VAR+VAR sequence has not been adapted for use with nickel base superalloys. Nickel base superalloys generally have a shallower melt pool during VAR melting when compared to steel alloys. Because the melt pool on the surface of a forming VAR ingot of a nickel base superalloy is relatively shallow, the residence time and Lorenz forces may not be sufficient to allow oxide inclusions to float and move to the outer surface of the molten pool during the remelt procedure. An intermediate ESR operation provides an effective means to provide a deep pool for flotation and a reactive slag to reduce relatively large quantities of residual metal oxides of different combinations. Therefore, a VIM+VAR+VAR sequence is inferior for nickel base superalloys when compared to a VIM+ESR+VAR sequence.

Even so, it has been observed that oxides can survive an ESR operation conducted on a nickel base superalloy, and oxide inclusions can be carried into the final remelting operation in a triple melt sequence (VIM+ESR+VAR). An objective of the present invention is to reduce the incidence of residual oxides, as well as carbide and carbonitride agglomerations associated with, for example, crucible contaminants in nickel base superalloys.

In the production of certain titanium alloys, multiple VAR operations have been applied to remove harmful effects of high density inclusions including nitrides from the titanium alloys during primary melt or remelt operations. However, it is believed that a sequence of multiple VAR operations has not been applied to the refining of nickel base superalloys. The primary melt practice in the case of titanium alloys provides some insight into why multiple VAR steps have been applied to titanium alloys, but not previously to nickel alloys. The primary step in the conventional titanium melt process utilizes a welded electrode of sponge material and scrap material. This primary electrode can contain nitrides which readily form with titanium or melt contaminants such as TiN tool bits used in machining. Since the primary melt step in titanium production is typically a VAR operation of this composite electrode, such inclusions can be trapped in the solidifying pool. The multiple melt steps are utilized to progressively dissolve any retained material during the progressive operation. Conversely, titanium readily accepts oxides into solution and it can be utilized as an alloy strengthener in many cases. In the production of nickel base alloys, the original melt is a vacuum induction melt in which nitrides would be put into solution during the primary melt operation. Oxides typically form a slag or can be entrained in the melt stream during pouring. Therefore, the remelt operations in the production of nickel base alloys are directed at physically removing oxides rather than putting them in solution.

Figure 3:
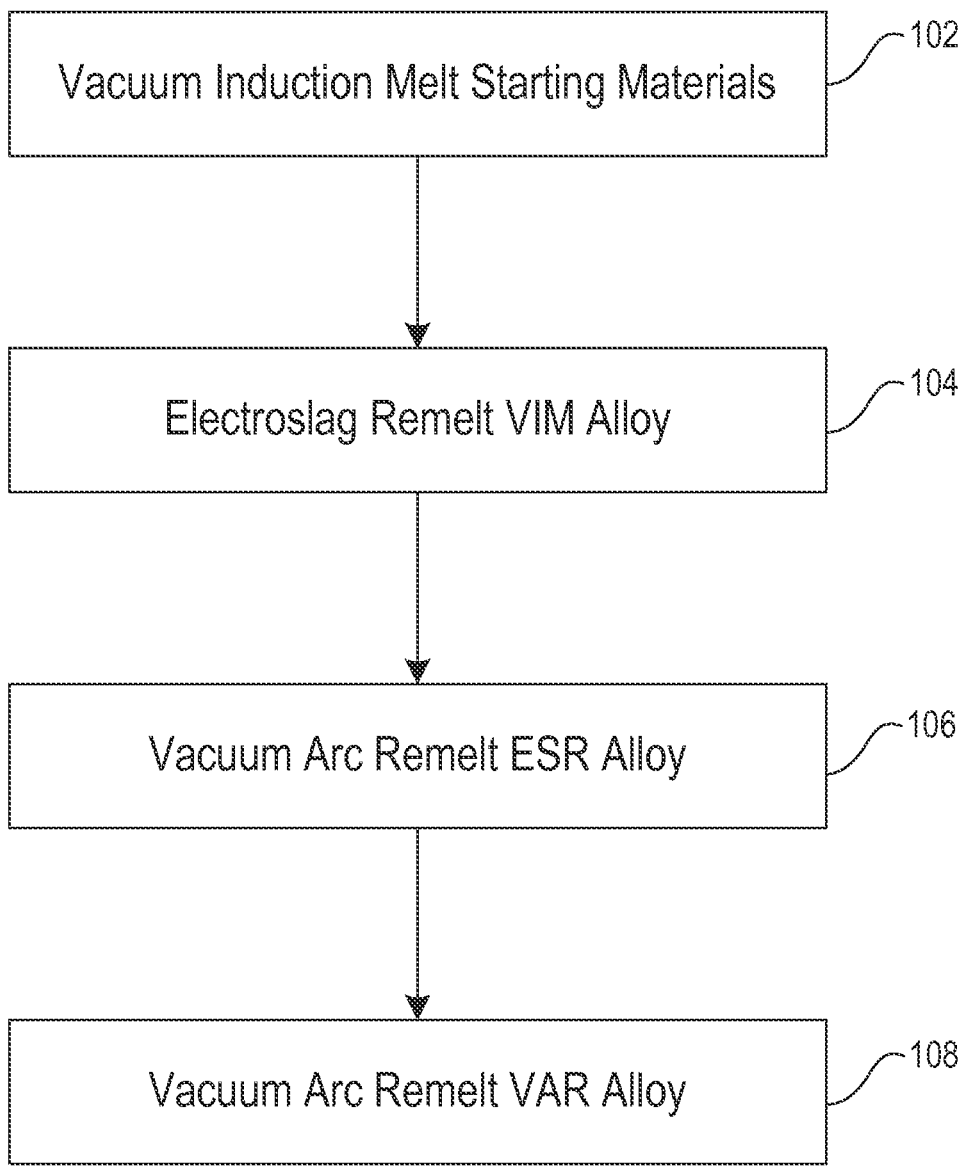
FIG. 3 is a flow diagram of a non-limiting embodiment of a method of melting and refining an alloy according to the present disclosure.

According to an aspect of the present disclosure, a nickel base alloy is provided by an improved melting and refining sequence including a VIM operation followed by an ESR operation, and then followed by two sequential VAR operations. FIG. 3 is a flow diagram schematically illustrating this sequence. The sequence may be referenced by the shorthand VIM+ESR+VAR+VAR, and may be referred to as a "quadruple melt" process herein, terminology that fundamentally contrasts it with a triple melt sequence, as well as with double melt sequences. The terminal (final) vacuum arc remelt operation of the quadruple melt process may further reduce the incidence of oxide, carbide, and carbonitride segregates in the alloy. These segregates, which are subject to separation by density differences with the base alloy and thermal and electromagnetic flow within the melt, are directed to the solidifying ingot surface and can be removed during subsequent processing of the VAR ingot material. Nickel base superalloys, for example, made using the quadruple melt sequence according to the present disclosure have been observed to exhibit a reduced incidence of oxide, carbide, and carbonitride segregates, and may be used in critical components such as, for example, turbine disk components.

The final VAR melt operation of the quadruple melt sequence provides a means to remove clusters of secondary phases such as oxides, and clusters of carbides and carbonitrides that can become entrapped in an ingot product during prior melt operations. The oxides and secondary phase clusters typically are small and infrequent. Utilizing an ingot prepared by a VIM+ESR+VAR sequence as an electrode for the terminal VAR operation provides a relatively metallurgically clean starting stock which is further refined during the terminal VAR operation. Also, the terminal VAR operation may be conducted so that the content of elements having a relatively low vapor pressure is controlled. Such elements include, for example, magnesium, and potentially other elements that may provide the alloy with material properties important both in subsequent forming operations and in final applications. In conventional refining sequences including multiple vacuum melt operations, the content of alloying elements having low vapor pressure can be adversely affected. Thus, the quadruple melt process according to the present disclosure may improve the final integrity of the product and may refine alloy chemistry, without compromising the ingot chemical segregation.

FIG. 3 illustrates a non-limiting embodiment 100 of a quadruple melt sequence. With reference to FIG. 3, the VIM operation 102 of the quadruple melt sequence 100 involves induction melting charge materials to provide a partially refined alloy that may be used as an electrode for the following ESR operation. The VIM operation may be conducted in a conventional manner as known to those having ordinary skill to produce as-cast electrodes within required alloy specification ranges and having sufficient structural integrity to permit a stable remelt operation. The VIM operation uses induction coils to melt the raw material charge inside a refractory lined crucible. In certain non-limiting embodiments, the charge materials may include, for example and without limitation, both prime material, such as relatively high purity (e.g., 99+%) elemental materials produced by refining an ore body, and recycled material such as machined turning revert cleansed of residual cutting fluid. The raw materials are selected and combined in proportions to ensure the resulting heat adheres to the desired alloy specification. The VIM operation is typically conducted under a vacuum lower than 100 microns or under a partial inert gas atmosphere when the alloy specification includes low vapor pressure elemental requirements. In certain embodiments, the VIM process concludes with a pouring operation in which the electrodes may be bottom poured through a central sprue and runner system or each electrode may be top poured individually. Post-VIM operations typically include a stripping operation to extract the electrode from the mold after solidification and may include a surface grinding operation depending on the subsequent remelt method employed.

Again referring to FIG. 3, the ESR operation 104 of the quadruple melt sequence 100 involves electroslag remelting an electrode of the alloy prepared in the VIM operation 102. The ESR operation may be generally conducted in a conventional manner as known to those having ordinary skill. The VIM electrode may require grinding before the ESR operation to remove loose surface scale if present. In certain non-limiting embodiments of the operation, the alloy electrode may be welded to a non-consumable stub that includes a mating surface capable of transmitting, for example, at least 20 kW of electrical energy from the ESR furnace. The ESR process passes current through flux to melt the flux. Those having ordinary skill may readily determine the composition of suitable fluxes for a particular ESR operation. In certain embodiments the flux may be, for example, a $CaF_2$-based flux that also includes significant CaO (10-40 wt %) and $Al_2O_3$ (10-40 wt %) components. Additional oxides may be included in the flux in smaller concentrations to ensure flux chemistry compatibility with the remelting electrode and to minimize any gain or loss of reactive elements to the flux. Other oxides that may be employed in the flux include $La_2O_3$, MgO, $SiO_2$, $TiO_2$, and $ZrO_2$. The electrode is immersed in the molten ESR flux, which transfers sufficient heat to melt the electrode tip. The immersion depth of the electrode into the flux is typically 6-12 mm and is controlled in a conventional manner, for example, through either a resistance swing or voltage swing automatic control loop. The control loop may measure the offset of the resistance or voltage swing from the set point and adjust the electrode position in the proper direction to maintain the desired set point corresponding to the immersion depth. In certain non-limiting embodiments, the ESR second control loop either melts at a constant current set point or utilizes load cells to measure a melt rate per unit time. If employing melt rate control, the applied current may be adjusted to maintain the desired melt rate set point.

Again referring to FIG. 3, the first VAR operation 106 of the quadruple melt sequence 100 involves vacuum arc remelting an electrode of the alloy prepared in the ESR operation 104. The first VAR operation 106 may be generally conducted in a conventional manner as known to those having ordinary skill. The VAR electrode may require grinding to remove ESR flux entrapped in the extreme surface layer. In certain non-limiting embodiments, the electrode may be welded to a non-consumable stub that includes a mating surface capable of transmitting, for example, at least 15 kW of electrical energy from the VAR furnace. The VAR process passes current between the electrode and the resulting molten ingot forming directly below. The startup of the process passes current directly to a baseplate, such as, for example, a water-cooled copper baseplate. The copper baseplate does not melt because its high thermal conductivity rapidly transmits the resulting heat energy into the cooling water, so that the baseplate temperature does not exceed the melting temperature of copper. The VAR process typically maintains a relatively constant and conventional standoff distance (arc gap) of, for example, 6-12 mm between the electrode tip and the molten ingot top. In various embodiments, a standoff distance control loop automatically measures voltage and adjusts the electrode position in the proper direction to maintain a set point corresponding to the desired standoff distance. In certain embodiments, a VAR second control loop either melts at a constant current set point or utilizes load cells to measure a melt rate per unit time. If the control loop employs melt rate control, the applied current is adjusted to maintain the desired melt rate set point.

Again referring to FIG. 3, the second VAR operation 108 of the quadruple melt sequence 100 involves vacuum arc remelting an electrode of the alloy prepared in the first VAR operation 106. The second VAR operation 108 may be generally conducted in a conventional manner as known to those having ordinary skill. In certain non-limiting embodiments, for example, the second VAR operation is conducted in the same manner as the first VAR operation. Surface grinding of the first VAR ingot may be required to remove oxides present on and near the surface that accumulated during the first VAR operation. In various embodiments, the same control loops and methodology are applied to the second VAR step to control standoff and melting current and/or melting rate. The alloy composition dictates the segregation tendency, which in turn restricts the solidification conditions required to avoid the presence of deleterious phases. Deleterious phases may include, for example, zones of an abnormally high fraction of carbide precipitation and/or precipitation of topologically close packed (TCP) phases which generally act as stress concentrators that reduce the local ductility of the material. The combination of arc gap and melt rate may be controlled within minimum and maximum ranges, which are alloy composition dependent, to control the solidification rate within a range to produce a structure without an excessive fraction of deleterious phases. Those having ordinary skill in the art may readily determine advantageous operating parameters for the VAR operations without the need for undue effort and experimentation. To enhance the solidification rate at a given melt rate and arc gap, in various non-limiting embodiments an inert gas may be introduced into the gap between the copper crucible and the VAR ingot that occurs due to shrinkage associated with the solidification and cooling of the VAR ingot. The thermal conductivity of the inert gas may be orders of magnitude higher than the thermal conductivity of the vacuum that would otherwise exist in the gap.

The present quadruple melt method may be used with any alloys whose base element or primary constituent is any of vanadium, chromium, manganese, iron, cobalt, nickel, copper, niobium, molybdenum, technetium, ruthenium, rhodium, palladium, silver, tantalum, tungsten, rhenium, osmium, iridium, platinum, and gold. (As used herein, an element is the "primary constituent" of an alloy if the element's weight percentage exceeds that of each other element in the alloy.) A non-limiting list of specific commercially significant alloys that may be processed using the quadruple melt method of the present disclosure include: nickel base alloys and superalloys, including, for example, Alloy 718 (UNS N07718), Alloy 720 (UNS N07720), and Rene 65 alloy; cobalt base alloys and superalloys, including, for example, L605 alloy (UNS R30605); nickel-cobalt base alloys, including, for example, MP35N alloy (UNS R30035); and nickel-chromium-molybdenum alloys, including, for example, C-22 alloy (UNS N06022). The composition of each of those alloys is well known and is provided in the following table (the alloys also may include incidental impurities).

resistance to crack initiation and/or the propagation of existing cracks. Corrosion is another property whose performance may be enhanced by a lower rate of microstructural discontinuities. The commercial 718, 720, and Rene 65 alloys are currently processed by the triple melt method of VIM+ESR+VAR to provide material in, for example, aerospace turbine engine cores as engine disks. The present inventors believe that the fatigue performance of these alloys may be enhanced if processed according to the method of the present disclosure, enabling a longer service life of engine components made of the alloys, or permitting a lighter weight part while maintaining the current service life. Alloys such as C-22 alloy and MP35N alloy are often utilized in extreme corrosion environments in which enhanced alloy cleanliness could improve alloy performance. This is particularly so for pitting corrosion performance, where a microstructural discontinuity can initiate the corrosion reaction.

According to one non-limiting embodiment of a method of the present disclosure for melting and refining Alloy 718, the method involves a VIM+ESR+VAR+VAR sequence. The initial VIM step preferably is conducted in a conventional manner under a vacuum level less than 100 microns of pressure to allow for no more than minimal atmospheric contamination, inhibiting or preventing the excessive pickup of nitrogen. Electrodes produced in the VIM step are ground to reduce surface oxide content. An ESR operation using the electrodes is conducted in a conventional manner to provide a melt rate range of 6-20 pounds per minute. The ingot produced in the ESR step is conditioned by grinding to remove the ESR flux from the ingot's surface, before proceeding to a first VAR step. The first VAR step preferably is ideally conducted with a vacuum level less than 20 microns of pressure to allow for only minimal atmospheric contamination, an arc gap in the 6-12 mm range, and a melt rate in the 6-20 pounds per minute range. The first VAR ingot produced in this step may be conditioned by grinding to remove the ingot's surface layer, which contains higher oxide content than the ingot interior. The first VAR ingot is used as the electrode for a second VAR step. The second VAR step preferably is conducted with a vacuum level less than 20 microns of pressure to allow for only minimal

| Alloy | Alloy 718 | Alloy 720 | Rene 65 Alloy | L-605 Alloy | MP35N Alloy | C-22 Alloy |
|---|---|---|---|---|---|---|
| Ni | 50.0-55.0 | bal | bal | 9.0-11.0 | 33.0-37.0 | bal |
| Co | 1.0 max | 14.0-15.5 | 12.5-13.5 | bal | bal | 2.5 max |
| Cr | 17.0-21.0 | 15.5-16.5 | 15.5-16.5 | 19.0-21.0 | 19.0-21.0 | 20.0-22.5 |
| Fe | bal | 0.5 max | 0.75-1.20 | 3.0 max | 1.0 max | 2.0-6.0 |
| Mn | 0.35 max | 0.15 max | — | 1.0-2.0 | 0.15 max | 0.50 max |
| Mo | 2.8-3.3 | 2.75-3.25 | 3.8-4.2 | — | 9.0-10.5 | 12.5-14.5 |
| W | — | 1.0-1.5 | 3.8-4.2 | 14.0-16.0 | — | 2.5-3.5 |
| Nb | 4.75-5.50 | — | 0.6-0.8 | — | — | — |
| Ti | 0.65-1.15 | 4.75-5.25 | 3.55-3.90 | — | 1.0 max | — |
| Al | 0.2-0.8 | 2.25-2.75 | 1.95-2.30 | — | — | — |
| Si | 0.35 max | 0.2 max | — | 0.40 max | 0.15 max | 0.08 max |
| Zr | — | 0.025-0.050 | 0.03-0.06 | — | — | — |
| C | .08 max | 0.01-0.02 | 0.005-0.011 | 0.05-0.15 | .025 max | 0.015 max |
| B | .006 max | 0.01-0.02 | 0.01-0.02 | — | — | — |

Embodiments of the method according to the present disclosure may improve alloy cleanliness, leading to an increase in property performance where microstructural discontinuities are detrimental. The resistance to fatigue failure is an example of a mechanical property that will benefit from improved alloy cleanliness. Improved alloy cleanliness may improve fatigue properties by enhancing the atmospheric contamination, an arc gap in the 6-12 mm range, and a melt rate in the 6-20 pounds per minute range. In a preferred embodiment of the method, a larger diameter ingot (for example, 2-4 inches larger in diameter than the preceding ingot) is produced in each successive stage of the VIM+ESR+VAR+VAR sequence to maximize industrial efficiency, but a forgeback may be used between stages when necessary to accommodate equipment limitations. The forgeback will homogenize the prior ingot at, for example, 2175° F. (1190° C.) for a minimum of 24 hours before forging to an appropriate smaller diameter. In one non-limiting example of the present method, Alloy 718 may be produced by the method so as to provide a 14 inch VIM ingot, a 17 inch ESR ingot, a 20 inch VAR (first VAR step) ingot, and then a 22 inch VAR (second VAR step) ingot. When higher weight parts are desired, such as parts for land-based gas turbines for electrical power generation, Alloy 718 may be produced by one non-limiting embodiment of the method so as to provide a 36 inch VIM ingot, a 40 inch ESR ingot, then an intermediate foregback step, a 36 inch VAR (first VAR step) ingot, and then a 40 inch VAR (second VAR step) ingot.

According to one non-limiting embodiment of a method of the present disclosure for melting and refining Alloy 720, the method involves a VIM+ESR+VAR+VAR sequence. The initial VIM step preferably is conducted in a conventional manner under a vacuum level less than 100 microns of pressure to allow for no more than minimal atmospheric contamination, inhibiting or preventing the excessive pickup of nitrogen. The electrodes produced in the VIM step may be ground to reduce surface oxide content. ESR is conducted in a conventional manner with the electrodes produced from the VIM operation using a melt rate range of 6-20 pounds per minute. The ingot produced in the ESR step is conditioned by grinding to remove ESR flux from the ingot's surface, and the ingot is then subjected to a first VAR step. The first VAR step preferably is conducted with a vacuum level less than 20 microns of pressure to allow for only minimal atmospheric contamination, an arc gap in the 6-12 mm range, and a melt rate in the 6-20 pounds per minute range. The first VAR ingot may be conditioned by grinding to remove the ingot's higher oxide surface layer, and the ingot is then used as the electrode for a second VAR step. The second VAR step preferably is conducted with a vacuum level less than 20 microns of pressure to allow for only minimal atmospheric contamination, an arc gap in the 6-12 mm range, and a melt rate in the 6-9 pounds per minute range (Alloy 720 has a higher segregation tendency than Alloy 718). In a preferred embodiment of the method, a larger diameter ingot (for example, 2-4 inches larger in diameter than the preceding ingot) is produced in each successive stage of the VIM+ESR+VAR+VAR sequence to maximize industrial efficiency, but a forgeback may be used between stages when necessary to accommodate equipment limitations. The forgeback will homogenize the prior ingot at, for example, 2175° F. (1190° C.) for a minimum of 24 hours, before forging to an appropriate smaller diameter. In one non-limiting example of the present method, Alloy 720 may be produced by the method so as to provide an 18 inch VIM ingot, a 20 inch ESR ingot, a 22 inch VAR (first VAR step) ingot, and then a 24 inch VAR (second VAR step) ingot. When higher weight parts are desired, such as parts for land-based gas turbines for electrical power generation, in one no-limiting embodiment Alloy 720 may be produced by the method so as to provide a 24 inch VIM ingot, a 26 inch ESR ingot, then an intermediate foregback step, a 24 inch VAR (first VAR step) ingot, and then a 26 inch VAR (second VAR step) ingot.

According to one non-limiting embodiment of a method of the present disclosure for melting and refining MP35N alloy, the method involves a VIM+ESR+VAR+VAR sequence. The initial VIM step preferably is conducted in a conventional manner under a vacuum level less than 100 microns of pressure to allow for no more than minimal atmospheric contamination, inhibiting or preventing the excessive pickup of nitrogen, and the electrodes produced in the VIM step are ground to reduce surface oxide content. The electrodes produced in the VIM step are subjected to ESR using a melt rate range of 6-20 pounds per minute. The ingot produced in the ESR step is surface ground to remove ESR flux from the ingot's surface, and the ingot is then subjected to a first VAR step. The first VAR step preferably is conducted with a vacuum level less than 20 microns of pressure to limit atmospheric contamination, an arc gap in the 6-12 mm range, and a melt rate in the 6-20 pounds per minute range. The first VAR ingot may be conditioned by grinding to remove the ingot's higher oxide surface layer, and the ingot is used as the electrode for a second VAR step, which preferably is conducted with a vacuum level less than 20 microns of pressure to allow for only minimal atmospheric contamination, a 6-12 mm arc gap, and a melt rate in the 6-15 pounds per minute range (MP35N alloy has a higher segregation tendency than Alloy 718). In a preferred embodiment of the method, a larger diameter ingot (for example, 2-4 inches larger in diameter than the preceding ingot) is produced in each successive stage of the VIM+ESR+VAR+VAR sequence to maximize industrial efficiency, but a forgeback may be used between stages when necessary to accommodate equipment limitations. The forgeback will homogenize the prior ingot at, for example, 2175° F. (1190° C.) for a minimum of 24 hours before forging to an appropriate smaller diameter. In one non-limiting example of the present method, MP35N alloy may be produced by the method so as to provide an 18 inch VIM ingot, a 20 inch ESR ingot, a 22 inch VAR (first VAR step) ingot, and then a 24 inch VAR (second VAR step) ingot.

Although the foregoing description has necessarily presented only a limited number of embodiments, those of ordinary skill in the relevant art will appreciate that various changes in the methods and systems and other details of the examples that have been described and illustrated herein may be made by those skilled in the art, and all such modifications will remain within the principle and scope of the present disclosure as expressed herein and in the appended claims. For example, although the present disclosure has necessarily only presented a limited number of embodiments of heating patterns and heat source velocities, it will be understood that the present disclosure and associated claims are not so limited. Those having ordinary skill will readily identify additional heating patterns and may use additional heat source velocities along the lines and within the spirit of the necessarily limited number of embodiments discussed herein. It is understood, therefore, that the present invention is not limited to the particular embodiments disclosed or incorporated herein, but is intended to cover modifications that are within the principle and scope of the invention, as defined by the claims. It will also be appreciated by those skilled in the art that changes could be made to the embodiments above without departing from the broad inventive concept thereof.

We claim:

1. A method of melting and refining an alloy, the method comprising:
   vacuum induction melting starting materials to provide a vacuum induction melted alloy;
   electroslag remelting at least a portion of the vacuum induction melted alloy to provide an electroslag remelted alloy;
   vacuum arc remelting at least a portion of the electroslag remelted alloy to provide a singly vacuum arc remelted alloy; and vacuum arc remelting at least a portion of the singly vacuum arc remelted alloy to provide a doubly vacuum arc remelted alloy;

wherein the vacuum induction melted alloy comprises, in weight percentages based on total alloy weight, 12.5-13.5 Co, 15.5-16.5 Cr, 0.75-1.20 Fe, 3.8-4.2 Mo, 3.8-4.2 W, 0.6-0.8 Nb, 3.55-3.90 Ti, 1.95-2.30 Al, 0.03-0.06 Zr, 0.005-0.011 C, 0.01-0.02 B, Ni, and incidental impurities.

2. The method of claim 1, wherein vacuum arc remelting comprises forming a vacuum arc remelted ingot in a crucible, and wherein in at least one of the vacuum arc remelting steps an inert gas is introduced into a gap between the crucible and the ingot.

3. The method of claim 1, wherein the step of vacuum arc remelting at least a portion of the singly vacuum arc remelted alloy removes a phase selected from the group consisting of a carbide phase and a topologically close packed (TCP) phase.

4. The method of claim 1, wherein the step of vacuum arc remelting at least a portion of the singly vacuum arc remelted alloy removes a material selected from the group consisting of an oxide, a carbide, and a carbonitride.

5. A method of melting and refining an alloy, the method comprising:

vacuum induction melting starting materials to provide an alloy;

electroslag remelting at least a portion of the alloy to provide a first ingot;

vacuum arc remelting at least a portion of the first ingot to provide a second ingot; and vacuum arc remelting at least a portion of the second ingot;

wherein the alloy comprises, in weight percentages based on total alloy weight, 12.5-13.5 Co, 15.5-16.5 Cr, 0.75-1.20 Fe, 3.8-4.2 Mo, 3.8-4.2 W, 0.6-0.8 Nb, 3.55-3.90 Ti, 1.95-2.30 Al, 0.03-0.06 Zr, 0.005-0.011 C, 0.01-0.02 B, Ni, and incidental impurities.

6. The method of claim 5, wherein vacuum arc remelting comprises forming a vacuum arc remelted ingot in a crucible, and wherein in at least one of the vacuum arc remelting steps an inert gas is introduced into a gap between the crucible and the ingot.

7. The method of claim 5, wherein the step of vacuum arc remelting at least a portion of the second ingot removes a phase selected from the group consisting of a carbide phase and a topologically close packed (TCP) phase.

8. The method of claim 5, wherein the step of vacuum arc remelting at least a portion of the second ingot removes a material selected from the group consisting of an oxide, a carbide, and a carbonitride.

* * * * *